Patented Sept. 4, 1934

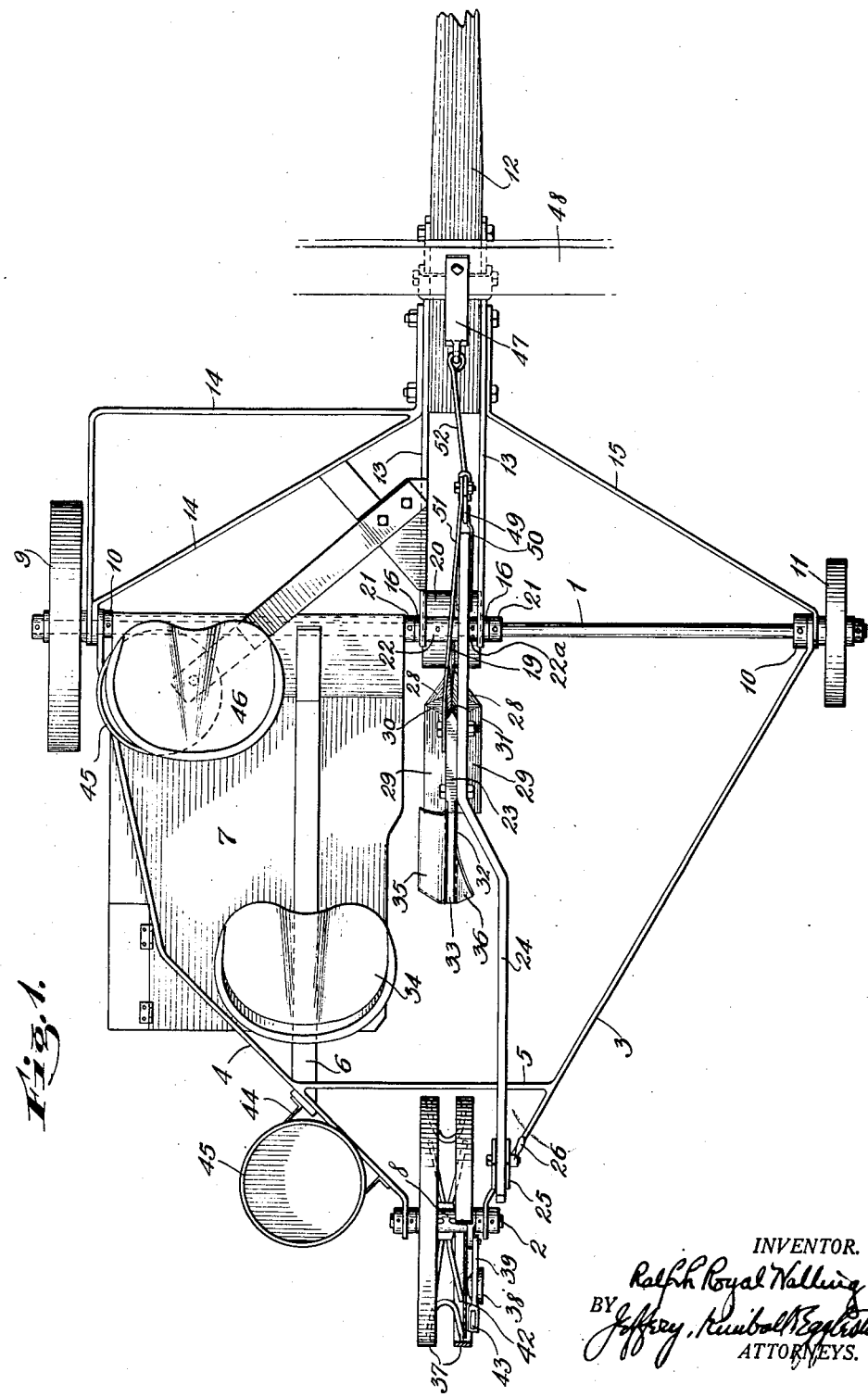

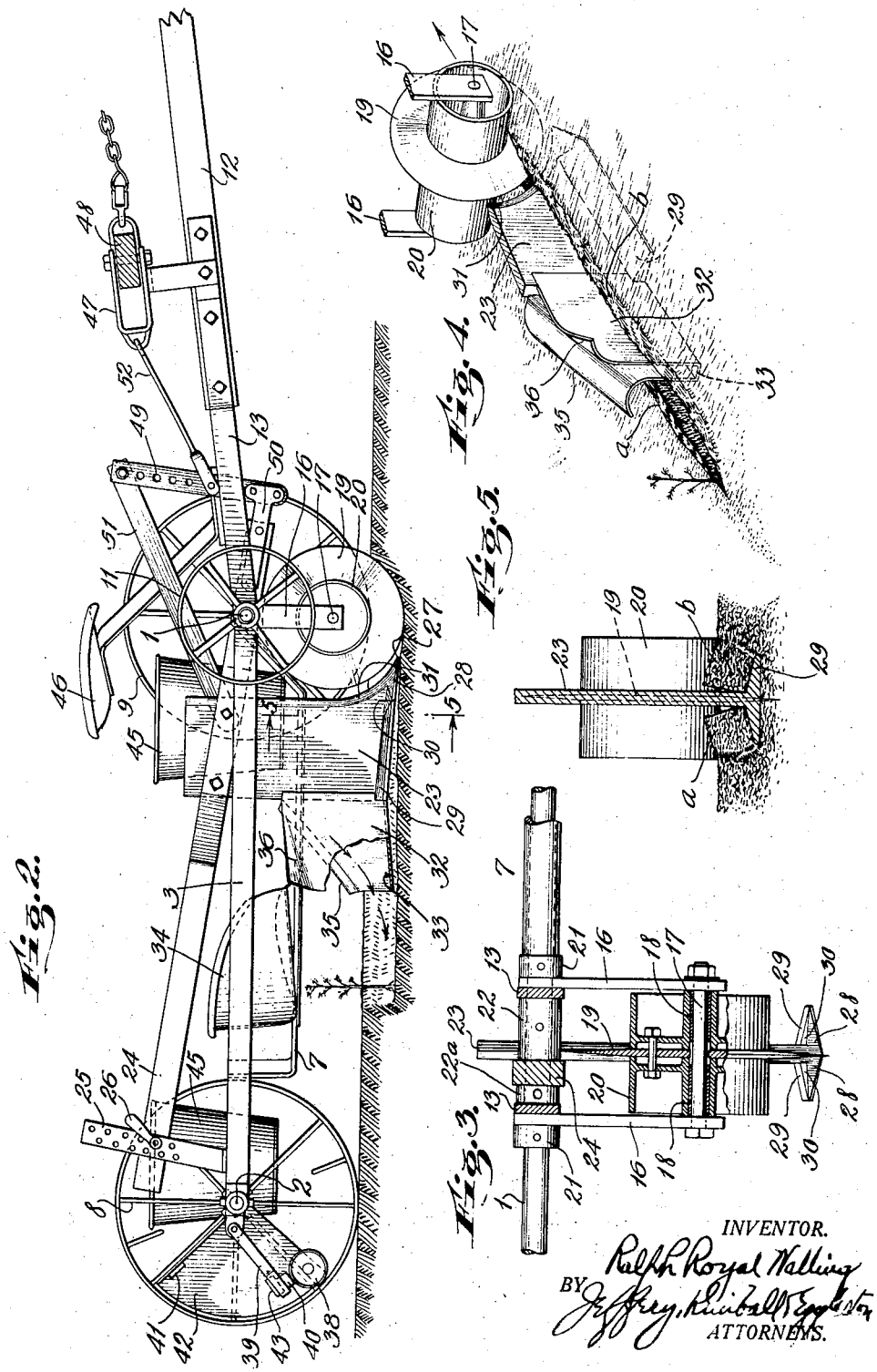

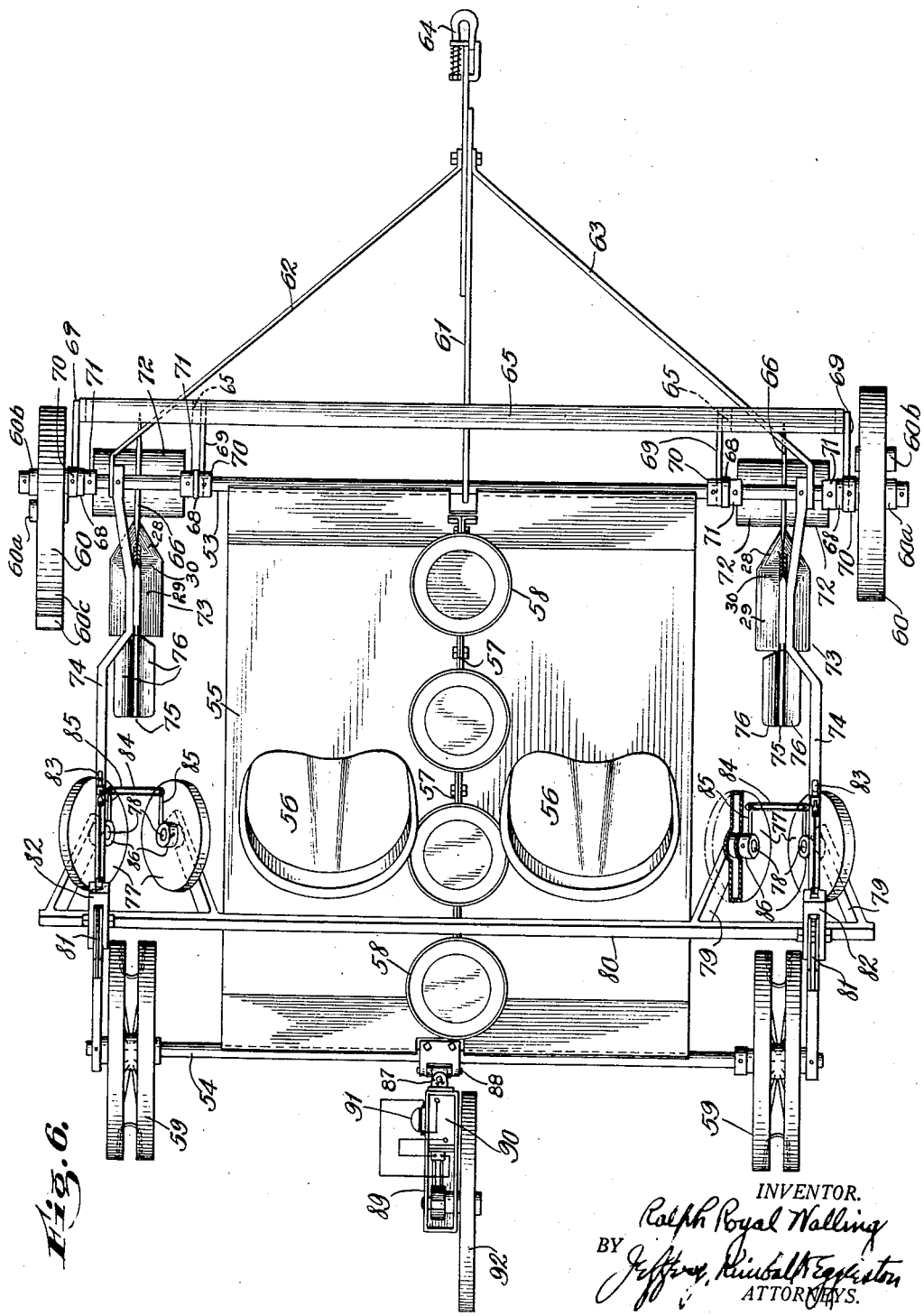

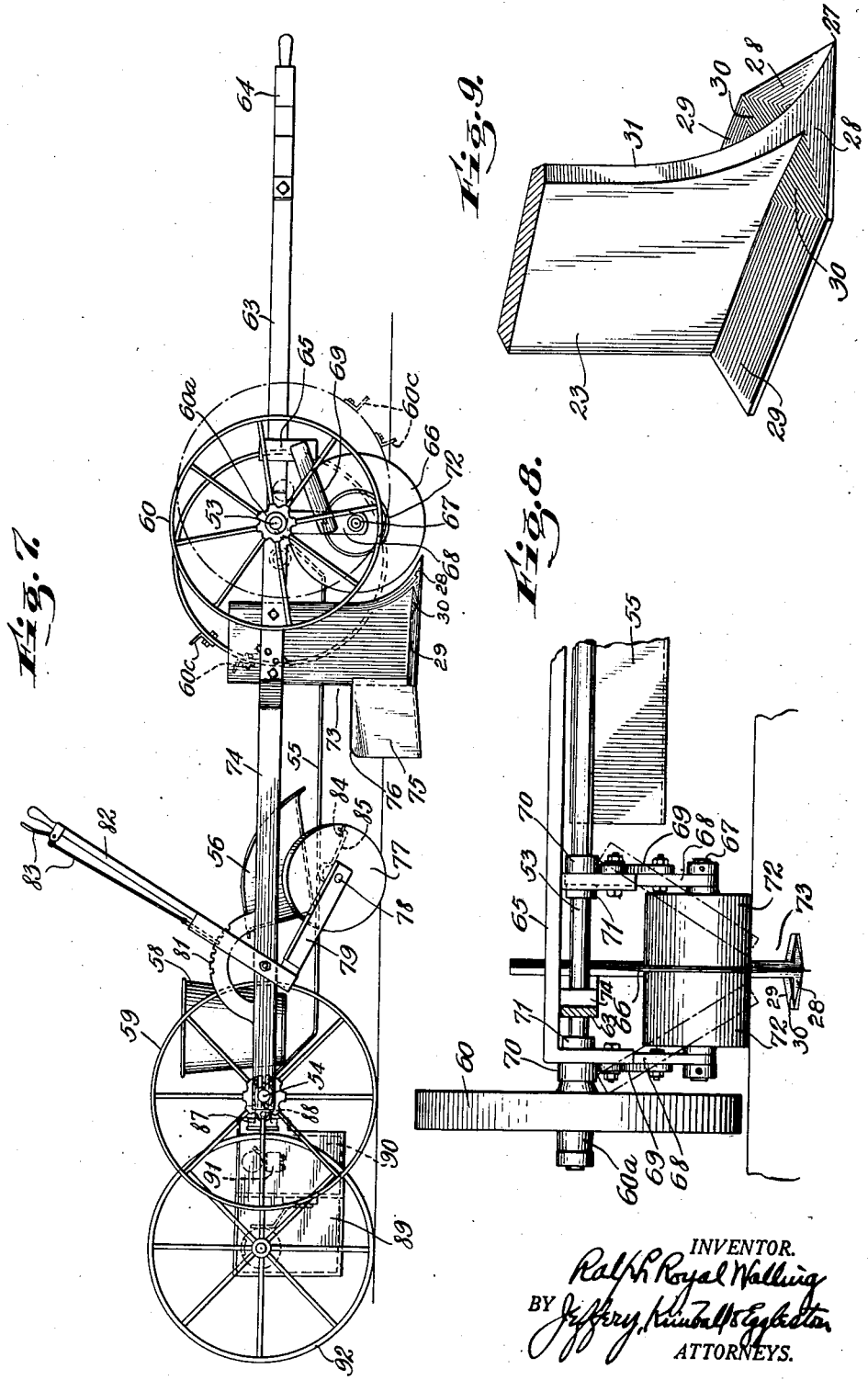

1,972,281

UNITED STATES PATENT OFFICE 1,972,281

METHOD OF AND APPARATUS FOR REFORESTATION

Ralph Royal Walling, Cortland, N. Y., assignor to Champion Sheet Metal Company, Inc., Cortland, N. Y., a corporation of New York Application October 23, 1930, Serial No. 490,609

43 Claims. (Cl. 111—52)

The invention relates to reforestation and includes both the method of reforestation hereinafter set forth and machines for reforesting, in accordance with that method. Reforestation implies the setting of small trees at regular intervals in spaced rows over considerable areas of land of diverse character, ordinarily rough ground not plowed or otherwise especially prepared for planting, but in its natural condition, often of irregular contour and covered with heavy sod, moss, high weeds, berry and other bushes, scattered saplings, thickets of bushes, etc., the ground displaying or concealing field stones and occasional rocks, and being in some instances hard and stony and in others moist and soft. Any method of reforestation or machine for reforesting must, therefore, be capable of operating under any of a variety of difficult conditions, such as those indicated, and cannot be deemed successful merely because effective in carefully prepared soil. The method and the machines about to be described, not only in their broad aspect, but also in many of their particular features will be seen to be specially suited to overcome such difficulties and to resist breakage. The inapplicability to reforestation of old machines and methods of setting plants in prepared ground is evidenced by the practice, which is general, of planting small trees by hand in the old, slow and laborious, as well as expensive, fashion. According to that procedure one man makes a hole by striking a mattock into the ground and a second man following him sets the tree therein and grinds it in with his heel. In this way two men can plant about 2,000 trees in a day as against 1,500 per hour by the present method on the single machine and 2,500 or more per hour on the double machine of this application at about one-third the cost.

The method and machines of this application, though having the special adaptation and characteristics referred to, may of course be used in prepared soil, or in ground devoid of vegetation and for setting plants other than trees.

The new method will be explained in detail in connection with the description of the machines, but may now be said to involve producing a self-closing slit, i. e. a slit or continuous vertical cut of such nature that the sod or soil will return substantially to its original position after planting, as distinguished from a furrow, a wide or open groove, ditch, or etc., as heretofore, and periodically setting small trees in it approximately as it closes.

Referring to the drawings:

Fig. 1 is a plan of the single machine;

Fig. 2 is an elevation corresponding to Fig. 1;

Fig. 3 is an enlarged detail vertical section through the front axle, coulter, etc., looking from front to rear;

Fig. 4 is an enlarged perspective showing the slit-forming and treating means and designed to roughly suggest steps of the method;

Fig. 5 is an enlarged vertical section on the line 5—5 of Fig. 2, showing the nature of the slit at that point;

Fig. 6 is a plan of the double machine by which two slits are cut;

Fig. 7 is a side elevation corresponding to Fig. 6;

Fig. 8 is an enlarged fragmentary detail front elevation showing one end of the front of the machine; and Fig. 9 is a perspective of the plow on a larger scale.

Figs. 1–5 relate primarily to a horse-drawn single type machine but illustrate also various features common to both types. The machine of these figures is provided with front axle 1 and rear axle 2 connected by substantial frame bars 3, 4, braces 5, 6, and supporting sheet steel platform 7 dropped well below the plane of the front axle. This main or vehicle frame is partially supported by divided or other ground wheel 8 mounted on the rear axle in substantially the central longitudinal or main vertical draft plane of the machine with interposition of bronze or other suitable bearings and by ground wheel 9 on the platform end of the front axle, at the side of the machine on which the weight is carried. Collars 10 fix the position of the ends of the bars 3 and 4 lengthwise of the axle 1 while leaving them free to turn with the frame on the axle. The other end of the axle extends outboard and carries an emergency ground wheel 11 of much less diameter than ground wheel 9 and normally out of contact with the ground. The removable tongue 12, which with associated parts may be regarded as the front part of the vehicle frame, or as a separate draft frame, is hinged on the front axle by the tongue bars 13, and by bush and tree guard bars 14, 15, of substantial depth and thickness, secured to the sides of the tongue, and extending across the machine and enclosing the axle just outside the bars 3 and 4. These bars, like all the other frame members and working parts are best made of steel so as to have the great strength required. They serve to turn bushes, saplings, etc., down out of the way to permit the machine to pass over them and have proved effective in the case of saplings up to twelve feet high and three inches in diameter. The tongue also has downwardly extending arms 16, which may be welded to arms 13 and which turn with the tongue about the axle. These arms carry coulter shaft 17 on which, with interposed bronze bearings 18 (or roller or other antifriction bearings), is mounted for rotation the coulter disc 19 driven by traction ground wheel means 20, which may be of any suitable and sufficiently robust construction and is shown as a pair of drums made fast to the coulter disc by bolting, welding, or both. These drums serve also as depth gauges. Collars 21 pinned to the axle 1 outside the arms 16 hold them against movement along the axle. Other collars, 22 and 22ª fast to the axle inside the respective arms 13 further block endwise movement and maintain adjacent parts in correct position. The coulter is the first of the fore and aft line of slit forming and treating means and acts to slit the sod continuously, being rotated strongly by the driving drums 20. This action has been found to be important, since when the coulter stops turning, sod, earth, stones, etc. accumulate about it and neighboring parts and gum up the machine, necessitating the removal of such material before the machine can proceed. These drums extend lengthwise of the shaft far enough to give the needed traction area and ground wheel support. This length may vary, as will be apparent from comparison of Figs. 3 and 4 with Fig. 1, the greater length represented by the detail figures being, however, preferred. As the coulter is the most advanced part of the machine, so far as contact with the ground is concerned, and is therefore subject to severe shock from stones, rocks and other obstacles, great strength is required and also flexibility of mounting to enable the coulter to adapt itself to shocks and changing strains and to prevent the machine from being blocked or the parts damaged. Both these characteristics are afforded by the construction just described in which the coulter, being hinged with the tongue on the axle, may turn with respect thereto and with reference to the main frame and structure mounted thereon. This hinged relation of the two parts to the frame is believed to be novel and is of substantial importance, as will appear in the further description of the slit forming and treating structure. For the service for which this machine is primarily intended, i. e. handling all ages and kinds of forest planting stock from one year seedlings up to five year transplants, the coulter may ordinarily be of a standard size, giving a slit depth of about 4½", but coulters giving a much greater depth will be required in some instances, as in the case of long leaf Southern pine, and no limitation to any particular depth is intended. It is important that the depth of the vertical cut be correct for the particular seedling being planted, since it may die if planted at too great or too slight a depth, or not grow properly. Maintenance of the correct depth regardless of the undulations of the ground is insured by the coulter drums. It will now be appreciated that the coulter traction drums 20 serve with the ground wheels 8 and 9 to support the entire machine, the outboard emergency wheel 11 acting only when necessary to prevent the machine from tipping over too far where the ground is exceedingly rough and uneven. The weight of the machine and operator is thus largely delivered to the side edges of the slit, where it is needed for traction purposes and to bring to bear the considerable pressure required after planting. Should the weight be insufficient the rear of the machine may be loaded.

Immediately in rear of the coulter disc, in line therewith and as close thereto as practicable, is firmly supported from the frame the next of the set of devices for producing and treating the slit, viz. the plow whose shank 23 is bolted to the plow beam 24, which extends generally lengthwise of the machine, and, at a point a little in rear of its front end, is hinged on the front axle between the collars 22 and 22ª, its rear end being adjustable in divided bar 25 by bolt and handle nut 26.

This plow, best shown in Fig. 9, is specially designed to meet the requirements of reforestation and is the means for carrying out the next step in the method, namely, slightly widening the slit and undercutting the sod at the edges of the slit and lifting the undercut portions and turning them slightly upward and outward about substantially the outer edge of the undercut, thus giving them a bias toward closing, so that they close when permitted to do so, but are supported meanwhile in the raised overbalanced-inward position.

The plow has a laterally disposed shoe portion, and, in the illustrated plow, the plow shank terminates at the bottom in a shoe of generally oblong shape and of considerable length having a forwardly projecting toe triangular both in plan and in section and brought to a point 27 in front in the longitudinal central plane of the shank to present the least possible resistance to entering and passing through the soil. No part of this shoe projects below the plow point, thus avoiding the production of a runner effect which would carry the plow up out of the ground. The shoe is bevelled both at the sides of the toe and at the sides of the shank at a moderate angle to the horizontal (say about 30°) as indicated respectively at 28 and 29. The object of the inclination of the sides of the toe is to allow the soil to be raised gradually so that it will not be broken up more than necessary. To further this aim, it is preferred to avoid abrupt change from front bevel 28 to side bevel 29 by interposing the surface 30 inclined upward slightly toward the latter. The sharp point, cutting edges and bevels 28 of the toe of the plow, with the following side ledges 29, wedge out a cross groove, undercutting both edges of the vertical slit cut by the coulter, as shown in Fig. 5, where the respective raised undercut portions a, b, have been turned slightly upward and outward, being lifted at the center of the slit by the inclined ledges 29, but not disturbed at the outside edges of the plow. During this operation, the sharp shank of the plow acts to divide the soil where the coulter has cut it and to slightly widen the slit.

The plane of the plow shoe is raised at the rear from ½" to 1½" above the plow point. The object of this is to point the plow slightly downward so that when it rests on the top of the ground and is drawn forward it will dig itself in. The re-entry of the plow after being forced out of the ground by stones etc. is thus insured. The adjustment of the plow beam already described is the means for varying this pitch according to the character of the ground.

Making a continuous vertical cut through the sod, producing an undercut beneath the sod and holding the undercut slightly lifted makes it possible for the tree setter to get a good distribution of the root system of each tree planted, the planting slot being held open long enough for that purpose and the proper closing of the slot, especially at the bottom, being then secured.

The importance of the described method of forming and treating the slit further appears when it is considered that if a groove or trench were dug out without undercutting one or both of its edges, particularly if in sod which may consist of a mass of grass, roots, earth, etc., or possibly of heavy moss, it would not have any tendency to close, but would remain open so that the roots of a tree planted therein would be exposed to the air which would kill it, whereas the self-closing slit of this application protects the trees planted in it. Moreover it is difficult to forcibly close an ordinary slot particularly in sod, clay, or the like.

The slit when cut is but the thickness of the coulter knife blade, when widened by the plow shank actually used it became about an inch wide. The plow was 5" wide at the bottom and each ledge 2" wide and about 1" high above the bottom where the side bevel leaves the plow shank. The length of the plow proper to the plow point was about 15⅜". These dimensions are stated not as limitations to a particular size or shape, but as data tested and known to be satisfactory.

The plow point 27 is very close to the coulter blade being nearer it than any other part of the plow and slightly above (say one-half inch) the lowest point of the coulter blade to avoid picking up stones that the coulter has passed over. The front edge of the shank, which is bevelled at each side to form a sharp edge in its central plane, extends, in the plow shown, from the vertical downward and forward along the top of the toe to the plow point on a curve 31 having the same radius as that of the coulter disc, but struck from a center back of and a little above that of the coulter so that the space between the rear edge of the coulter disc and the front edge of the plow is smallest at the bottom and larger at points higher up. The provision of adequate space is important, because it allows any stone or other obstruction, which is small enough to pass between the coulter and the plow point, to free itself as it goes into this space above and back of the plow point. In the successful machines above referred to, the width of this space at the bottom, with the plow and coulter in the relation shown in Figs. 2 and 7, was about ½", and at the top, i.e. on the horizontal diameter of the coulter, about 1½". This is not to be understood as a limitation to these figures, but conveys information as to dimensions which have worked well.

The fact that the traction drums positively drive the coulter also strongly assists in working stones out of the space between the plow and the coulter or preventing stones from entering it. The hinging of the coulter on the front axle, which enables the plow and coulter, as the machine advances, to swing in a vertical plane toward and from each other and to some extent up and down, thus varying the distance between them horizontally, also serves to clear the parts from obstruction by stones or otherwise. The entire main frame of the machine carrying the plow, if the rear wheel is forced off the ground, or otherwise raised, turns about the axis of the front axle, independent of any movement of the coulter and this also helps the machine to meet the difficult conditions attending its use. The movement of the plow and coulter will be seen to be self-accommodating. Still another factor in assuring the parts freedom from obstruction is the possibility of lateral movement of the coulter and its supporting structure under severe strain. Stones and other obstacles of various sizes and in all sorts of relations are met by the coulter and should, in the main, be handled automatically by the machine without necessitating its stoppage to get them out of the way.

The plow shank 23 is rabbeted at each side of its rear edge, to receive flush with the side of the shank the sides 32 of a hollow rear plow shank extension constituting a planting slot, having a closed bottom 33 and open at the top and rear. This planting slot serves to defer the return of the undercut edge portions a and b of the slit, which are released after the side ledges have passed, but are prevented for the time being from coming together by the sides of the planting slot. As the planting slot passes, however, the undercut edges, being overbalanced inward, begin to fall back to their original position thus starting to close the slit so that it presents for the planting a rearwardly narrowing triangular open portion. The planting slot serves as guide to correct setting position for the small tree being set by the operator, whose seat 34 is on the low platform 7 near its edge within easy reach of the planting slot and ground. The operator, to save time, holds in his left hand a number of the trees with their roots uppermost, grasps one at about the proper planting depth and swinging down his arm moves the tree into and through the slot, as indicated by the arrows in Fig. 2, and back in this rearwardly narrowing triangular portion of the slit to substantially its apex where the edges close together or very nearly approach each other, and sets it substantially as the slit closes. The tree-setter frequently experiences the sensation of having the tree grasped by the slit and taken out of his hand as he sets it. The out-turned wings 35, 36 of the planting slot assist in directing the tree into the space between the sides and the wing 35 constitutes a guard to protect the hand of the tree-setter from bushes, thorns, etc. The planting slot being an extension of the plow shank is adjustable with the plow, and, in the machines illustrated, to avoid the bottom 33 being too near the surface on a relatively high adjustment of the plow beam 24, it is given a rearward and downward pitch from the rear of the plow shank to a point in substantially the same horizontal plane as the plow point. The shoe of the plow and the rearward extension of the plow shank are thus pitched in opposite directions.

The rear ground wheel 8 is shown as having a divided rim 37, which straddles the slit so that the planted tree is in the space between the rims as the wheel acts to press down the sod at each side of the slit. Two separate wheels or a single wheel with an uninterrupted tread may be used. It has been found that trees passed over by such a wide tire spring back to upright position and do not suffer injury.

In order to enable the operator who is setting trees to plant them at the proper uniform distance apart, it is preferred to provide a timer or measuring device giving a signal whenever a tree should be set. Such a device is shown in Figs. 1 and 2, where the ground wheel 8 carries near its periphery a bell 38 and near its center a pivoted striker 39 having a weighted head 40, for striking the bell once in each rotation of the wheel, so that the periphery of the wheel being six feet, the trees will be planted that distance apart, if the tree setter plants on signal. In case the signal should not be heard, or should in some way be disregarded, an anvil 41 is provided at the other end of the sheet metal guard 42, which gives a second audible signal when the back 43 of the head 40 strikes it.

Racks 44 for tree-holding pails 45 may be provided as convenient. The driver's seat 46 is mounted on the tongue structure. This form of machine is drawn by a team of horses, draft iron 47 being pivotally mounted on the tongue and serving as connection for equalizer bar 48, the whippletrees etc. Deeper or shallower draft is provided for as follows: The forward end of the plow beam 24, already referred to, projects beyond the axle 1 and has an upwardly and forwardly inclined bar 49, secured thereto by side irons 50 and braced by a bar 51 connecting its upper end to the plow beam in rear of the axle 1. A link 52, whose rear end is adjustable in spaced holes in the bar 49, connects the draft iron 47 therewith. It will be apparent that the higher the point of connection, the deeper the draft angle. This adjustment is desirable, especially on a horse vehicle, which is relatively light and is particularly useful where the surface of the ground is hard and stony or difficult to penetrate as in the case of thick moss. By this means, as will be apparent, the pull of the team may be exerted higher or lower, thus making the pull of the machine hold the plow in the ground to a greater or less degree.

For some conditions this light horse drawn machine is preferable to the heavier double machine about to be described and which is illustrated in Figs. 6 to 8 inclusive, but where a tractor is available and the nature of the land permits its use, planting may be speeded up, with the employment of only one more man, by the use of this double machine whose mechanism is in many respects the same as that described in connection with the single machine. With the aid of this double machine two properly spaced self-closing slits may be produced at the same time and trees planted at the proper intervals in each. The method which this machine is designed to carry out is, in the main, that already described. The double machine has front and rear axles 53, 54 respectively, and a dropped sheet steel plate 55 welded to both and constituting an operator's platform having seats 56 for the operator at each side thereof in convenient location for planting and racks 57 for tree holding pails 58, located and arranged as desired. This platform is partially supported by the rear ground and pressure wheels 59 mounted on the ends of the rear axle. The wheels 60 at the ends of the front axle do not act as ground wheels, except on soft ground, but are usually carried slightly off the ground, as shown in Fig. 8, ready to so act, whenever the weight of the machine carries them into contact with the ground. Alternative positions of the wheel are indicated in Figs. 6 and 7 and will be further referred to in due course. The tongue 61 embraces and is hinged on the axle 53 as are the guard bars 62, 63 secured to the tongue and extending across the machine and rearward to points near the ends of the axle. The tongue is provided with a usual hitch 64 for a tractor. A cross bar 65 forms a part of the tongue structure, being preferably welded thereto, and serves as a means for bracing the structure for supporting the coulters 66 at the opposite sides of the machine and for giving them the requisite strength while insuring their complete independence of each other. Each coulter is rotatably mounted on a stub shaft 67 supported by pairs of arms 68, hinged to the axle 53 and fixed to the bar 65 by braces 69, which may be welded to each as in other figures or bolted as in Fig. 8. External collars 70 and internal collars 71 pinned to the axle 53 at opposite sides of arms 68 preclude movement along the axle. It will be seen that, as in the single form, the coulters turn with the tongue about the front axle, and, when the machine is in action, move toward and from the adjacent plows and other parts of the machine as the changing characteristics of the ground encountered from moment to moment may require, the operation being in general similar to that already described. In addition, the coulters can be thrown back with the tongue over the frame for transportation, the plows having first been removed. The coulter-supporting structure, as in the other form has sufficient resilience to permit considerable transverse movement under severe strain, as on striking a rock, etc. This avoids breakage and automatically realigns the coulter on its release. As much as two inches lateral displacement is possible notwithstanding the fact that the arms and braces are of steel and of substantial thickness, say one-half or three-quarters inch. The traction ground and depth wheels 72 fast to the coulters are the same as above described, except that they are shown as longer (about 10") to exert greater tractive force. The plows 73 are the same as those already described and occupy the same relation to their respective coulter wheels, save that the plow beams 74 by which they are supported are pinned to the axle 53 and are not adjustable. The pitch of the plows may, however, be changed within a suitable range say 1¼" by removing the rear bolt fastening the plow shank to the plow beam and inserting it in a different pair of holes as indicated. The construction permits the main frame to be turned up about the axis of the axle 53 should the contour of the ground or an obstacle raise the rear wheel or wheels with reference thereto. The plow shaft extensions or planting slots 75, differ from the one already described only in having side guards 76 of somewhat different shape. Back of the rear plow shank extension, and at a suitable distance therefrom to permit setting of the trees, is located at each side of the machine a pair of heeling wheels 77 occupying planes intersecting the plane of the slit and designed to carry the weight of the machine and operator when advisable and to exert strong downward and inward pressure against the side edges of the slit after the tree has been planted in it to press the sod back to its original position so tightly that no air space is left around the roots. That they may be able to perform this heavy duty these wheels are rotatably mounted by bronze hubs or other suitable bearings on stub shafts 78 carried by arms 79 on a bar 80 extending across the machine and having at each side thereof means for swinging them clear of the ground and to a point as high as desired, so as to free them in the easiest and simplest way from obstructions such as stones and sod which accumulate at times between the coulters and heeling wheels and under the platform. The same means serves to correspondingly adjust the position of the wheels of both pairs through a range of locations in which they clear the ground, or act as ground wheels and exert respectively different pressures on it, thus increasing or diminishing the load on the rear wheels 59. This adjusting means, duplicated at each side of the machine, consists of a rack 81, fixed to the plow beam and a hand lever 82 having releasable latch means 83. It will be understood that the entire weight of the machine is normally supported by the two sets of ground wheels each resting on the edges of the respectively adjacent slot, or by such of said wheels as are at the time in ground wheel position. The ground wheels of each of these sets are, in the double machine illustrated, the coulter drums 72, the heeling wheels 77 and the wheels 59.

In order to prevent possible injury to the operator in setting the trees by having his hands cut by the sharp edges of the heeling wheels, rubber bands or pieces of other yielding material 84 are supported on fingers 85 extending forward from collars 86 on the stub shafts 78. These bands are located sufficiently in advance of the converging wheel disc edges to effect their purpose. It will be understood that heeling wheels may be used, if desired, in the single type machine.

The wheels 60 have a further function. Each has both a central hub 60$^a$ and an eccentric hub 60$^b$, each of which fits the front axle. The wheels may either be carried on the central hub, in which case their operation or lack of it is as above described, or, if preferred, they may be carried on the eccentric hubs being then turned rearward so that their peripheries merely slide along the sod, inequalities causing oscillation through small arcs but seldom or never actually throwing the weight forward beyond the center. When so used these wheels may carry or have attached to them at points on their peripheries on the side away from the eccentric hub and over as long an arc as considered desirable, cleats or other means 60$^c$ for preventing slipping. When the coulter at either side of the machine encounters an obstacle not readily surmounted, the adjacent wheel may be turned forward until it touches the ground, the cleats being then in front and entering or about to enter the ground, whereupon the wheel will act as a lever when the machine is drawn forward and will raise the coulter and the adjacent parts of the machine over the obstacle. It will be understood that a simple bar might be similarly mounted on the frame and used to perform this function without having also the other functions of the wheel, but the arrangement described is preferred.

The timing or measuring means provided in the double machine differs from that already described, being designed to give an unmistakable and louder signal and to function equally well on turns, and on straight runs. It is a trailer structure removably clamped to the rear axle with interposition of a universal joint 87, 88, and comprises a battery box 89, containing battery 90 and on which is supported an electric bell 91 connected in the battery circuit which is completed once in each rotation of the trailer wheel 92, whose periphery is six feet, so that the trees are planted at that distance apart. The illustrated means for interrupting and making the electric circuit is diagrammatic merely and will be understood without further explanation. The cover of the box is omitted to show the contents. The trees may of course be spaced at distances other than six feet, in which case the diameter of the trailer or other measuring wheel is correspondingly altered.

As a measure of convenience and brevity and in view of established principles of patent law, the machines chosen for illustration as embodiments of the invention have been described in detail without attempting to catalogue variations which might be made within the scope of the invention. Such particularity of description, however, is not to be construed as imposing on any claim any limitation not inherent in its language.

I claim:—

1. The method of planting tree seedlings in uncultivated sodded ground which consists in first making a continuous vertical cut through the sod by the use of a rotary coulter, next producing an undercut beneath the sod and holding the undercut portion in a slightly lifted position and introducing a tree seedling by hand while simultaneously restoring the said undercut portion to its original position, and downwardly compressing it.

2. The method of planting tree seedlings in uncultivated sodded ground which consists in first making a continuous vertical cut through the sod to the same depth regardless of the undulations of the ground, next producing an undercut beneath the sod and holding the undercut portion in a slightly lifted position and introducing a tree seedling by hand while simultaneously restoring the said undercut portion to its original position, and downwardly compressing it.

3. The method of planting tree seedlings in uncultivated sodded ground which consists in first making a continuous vertical cut through the sod, next producing an undercut beneath the sod and slightly heaving up the undercut portion, then temporarily deferring return of said undercut portion to its original position, releasing said portion and introducing a tree seedling by hand while simultaneously restoring the said undercut portion to its original position, and downwardly compressing it.

4. A machine of the class described comprising a vehicle frame having self-accommodating front and rear parts hinged to each other on a horizontal transverse axis, a coulter rotatably mounted on the front part of the frame, and a plow immediately in rear of the coulter and closely spaced therefrom mounted on the rear part of the frame and having its shank in the same fore and aft plane as the coulter disc.

5. A machine of the class described comprising a coulter having ground drums and driven thereby for producing a continuous slit in the ground, and a plow mounted immediately in rear of the coulter having a shank in the same vertical plane as the coulter and having downwardly and outwardly extending side portions for undercutting the respective edges of the slit produced by the coulter, said plow projecting downward and forward to a point near the edge of the coulter and separated from the edge of the coulter by a space narrowest at the bottom and increasing up to the horizontal diametrical plane of the coulter, said coulter and plow being relatively hinged on a raised horizontal axis so as to permit horizontal enlargement of the space between them as the machine advances.

6. A machine for reforestation comprising a coulter for producing a slit in the ground, said coulter having fast thereto traction ground drum depth gauges of less diameter than the coulter, a plow mounted on the machine immediately in rear of the coulter having a shank in the same vertical plane as the coulter and having at each side a lateral extension for undercutting the respective edges of the slit produced by the coulter, the front edge of the plow shank extending downward and forward to the toe of the plow, the plow edge and coulter edge approaching nearest at the bottom and being spaced further apart for some distance up the shank, and said coulter and plow being relatively hinged on a horizontal axis above the coulter in self-accommodating relation so as to permit horizontal enlargement of the space between them as the machine advances.

7. A machine of the class described having a vehicle frame, ground wheel means therefor, and a self-driving coulter disc having fast thereto traction ground drum depth gauge means of lesser diameter operatively associated with said frame as supporting means therefor, and a plow mounted on the vehicle frame immediately in rear of the disc and in line therewith fore and aft of the machine, said coulter and plow being mounted for free self-accommodating fore and aft movement relative to each other, as the machine advances, to permit variation of the space between them and the horizontal enlargement and contraction of said space as the changing characteristics of the ground encountered from moment to moment may require.

8. A machine of the class described having a vehicle frame, ground wheel means therefor, a draft frame pivotally connected to said vehicle frame on a transverse axis, and a self-driving coulter disc rotatably mounted on said draft frame beneath the point of connection of the draft frame to the vehicle frame and having fast thereto traction ground drum depth gauge means of lesser diameter operatively associated with said frame as supporting means therefor, and a plow mounted on the vehicle frame immediately in rear of the disc and in line therewith fore and aft of the machine, said coulter and plow being mounted for free self-accommodating fore and aft movement relative to each other, as the machine advances, to permit variation of the space between them and the horizontal enlargement and contraction of said space as the changing characteristics of the ground encountered from moment to moment may require.

9. A machine for reforestation comprising a vehicle frame, ground wheel means therefor, a coulter, and a planting-slit-treating plow mounted on the vehicle frame immediately in rear of the coulter and in line therewith fore and aft of the machine, said coulter being connected to draft means and said coulter and plow being secured to the machine with capability of turning freely relative to each other, as the machine advances, about the same transverse axis located at the front of the vehicle and directly over the coulter and in advance of the plow shank.

10. In a machine of the class described, a coulter disc and a plow immediately in rear of the disc and having its front edge in the same vertical plane as the disc and terminating in a plow point a little above the bottom of the disc and closely spaced horizontally from the edge of the disc, the space between the plow edge and disc edge widening upwardly from the plow point to the horizontal plane of the disc axis, said coulter and plow being hinged relatively to each other for free swinging movement on a horizontal transverse axis as the machine advances.

11. A machine of the class described comprising a vehicle frame having a front axle and a front draft part and rear part hinged together for self-accommodating movement about the axis of said axle as the machine advances, a coulter at the rear of the front member rotatably mounted beneath the said axle on an axis fixed with respect to the front part of the frame, a plow carried by the rear part of the frame at its front end immediately behind the coulter and having its shank in the same fore and aft plane as the coulter disc, and additional ground wheel means on the rear part of the frame.

12. A machine of the class described comprising in combination a self-driven coulter for slitting the ground, a plow just back of the coulter having a thin upright shank in line with the coulter and a laterally disposed shoe portion, a plow shank extension extending rearward beyond said shoe portion and said shank and being open at the top and rear and having a bottom portion and serving to keep the slit open for planting and provide a free passage for seedlings being set and to locate further from the coulter the point at which the slot closes and thus provide additional room for the tree setter, and a seat for the tree setter carried by the machine within easy reach of the plow shank rear extension and the closing point of the slot to enable the seedlings to be properly set.

13. A machine of the class described comprising a frame having mounted thereon, in a fore and aft line, a self-driving coulter for making a continuous slit of controlled depth in the ground, a plow immediately in rear of the coulter having means for widening the slit and making it self-closing, a rearward plow shank extension having soil excluding sides and bottom portion but open at the top and rear serving to maintain the width of the slit widened by the plow and to afford an open passage for plants being set by a plant setter at one side of said fore and aft line adjacent said plow extension, said rearward plow shank extension projecting up from within the slit to a point well above the surface of the ground.

14. In a machine for reforestation, a coulter having operatively connected thereto traction ground drums of lesser diameter for driving the same and constituting also depth gauges, said coulter being rotatably mounted on depending supporting arms secured to the machine with capability of free swinging fore and aft movement, as the machine advances, about a transverse horizontal axis above its own, the resilience of the metal of the disc and of the supporting arms permitting transverse movement under the severe strains encountered in reforestation.

15. In a machine for reforestation, a vehicle frame having a front axle, a tongue hinged on said axle and having fixed thereto a pair of depending arms, a coulter disc having traction ground wheel drums operatively connected thereto mounted for rotation in said arms.

16. A machine according to claim 15, in which the tongue has secured thereto guard bars extending across the machine and hinged at their ends on the axle.

17. A machine of the class described having means including a coulter located in a plane fore and aft of the machine for producing a continuous planting slot in the ground, said coulter being mounted to swing about a transverse overhead axis at the front of the machine, as the machine advances, coulter-driving ground drums located respectively at the opposite sides of the coulter and a rear compression ground wheel located in the plane of the coulter so as to rest on the edges of the planting slot, and a ground wheel opposite the coulter at one side of said plane at a distance therefrom, the weight of the machine being ordinarily supported by said ground drums and wheels to insure an adequate coulter drive and slot edge compression.

18. In a machine of the class described, a frame having a weight supporting platform at one side of its central longitudinal plane, a front axle having a ground wheel at that side of the machine, and an outboard emergency ground wheel of lesser diameter at its other end, ground wheel means at the rear of the machine in substantially said plane, a draft frame hinged on said axle, and a coulter disc beneath the axle rotatably mounted on said draft frame and located also in substantially said plane and having traction ground wheel drums fast thereto.

19. In a machine of the class described, a front axle having at one end a ground wheel and at the other an outboard emergency wheel of much less diameter normally out of contact with the ground, a coulter disc and associated means located in a fore and aft plane of the machine disposed inward from said ground wheel for producing and modifying a continuous planting slit in the ground to make it self-closing, and weight-supporting means on the side of said plane toward the ground wheel including a seat for a plant setter within easy reach of the modified slit for setting plants therein.

20. A machine of the class described having a frame, a transverse axle mounted thereon, a ground wheel carried by said axle in substantially the central vertical plane of the vehicle, a ground wheel on one end of said axle, and an emergency ground wheel on the other end of the axle normally out of contact with the ground, additional ground wheel means, devices for forming a continuous slot, and a seat on the machine for supporting an operator within easy reach of the slot to enable him to set plants therein.

21. In a machine of the class described, ground wheel means supporting the machine, a front axle, a plow beam hinged thereon, a plow supported by said beam in rear of said axle, and means for vertically adjusting the rear end of the plow beam to vary the pitch of the plow.

22. A machine of the class described comprising a frame having a front axle, a draft frame adapted to turn about such axle and a coulter rotatable in arms of the draft frame extending downward from the axle, said coulter having fast thereto traction ground drums, a plow beam mounted to turn about said axle, a plow secured to said plow beam back of said axle with its front edge and the toe of its shoe immediately back of the coulter disc and closely spaced therefrom, said shoe having a forward pitch, and means for adjusting vertically the rear end of the plow beam for altering said pitch.

23. A machine according to claim 22, in which the plow has a vertical shank and a hollow rear extension thereof for planting purposes having a closed bottom portion and open at the top and rear, said bottom having a rearward pitch and terminating at its rear edge in substantially the horizontal plane of the plow point at the lowest plow pitch adjustment.

24. In a machine of the class described, a plow having a vertical shank terminating at the bottom in a shoe having a forward pitch, said shank having also a hollow rear extension for plant setting purposes having a closed bottom portion and open top and rear, said bottom having a rearward pitch and terminating at its rear edge in substantially the horizontal plane of the plow point at the lowest plow pitch adjustment, and means for simultaneously raising the plow and plow shank extension about a horizontal axis above the plow shoe.

25. In a machine of the class described, a frame, a plow beam adjustably mounted on an axis transverse to the machine, a plow carried by the plow beam, a tongue mounted to turn on said axis, a draft connection pivotally attached to the tongue, said beam having an upward extension in advance of the axis, and a link adjustably connecting said draft connection with the upward extension of the plow beam to alter the draft angle.

26. In a machine of the class described, a frame, a plow beam adjustably mounted between its ends on an axis transverse of the machine, a plow carried by the plow beam, a tongue mounted to turn on said axis, the forward end of said beam having an upwardly extending adjustment bar, a brace connecting the upper end of said adjustment bar with the plow beam in rear of said axis, a draft connection associated with the tongue, and means for adjustably connecting it with said adjustment bar at variable distances from the ends of said bar to alter the draft angle.

27. In a reforesting machine, a plow having a rear plow shank extension constituting a planting slot having a closed bottom portion but open at the top and rear and having at its inner side an out-turned wing extending transversely from the open top of said rear extension and constituting a hand-protecting guard.

28. A machine of the class described having mounted thereon in a fore and aft line, a coulter disc and a plow immediately in the rear of the disc having a narrow shank located in a vertical plane and sharpened along its front edge, said shank terminating at the bottom in a shoe having ledges extending out at each side of the shank and beveled downward and outward therefrom on a moderate angle, said shank and shoe extending downward and forward in front to form a toe substantially triangular in vertical cross section and beveled at each side downward and outward at a moderate angle, the edge of the shank being continued from the vertical on a curve downward and outward to the end of the toe where it terminates in a point close to the coulter disc and slightly above its lowest point, said disc and plow being closely spaced and the space between them being narrowest at the bottom and gradually increasing up to the horizontal diameter of the coulter, said coulter and plow being movable relatively to each other to vary the horizontal distance between them.

29. A machine of the class described having means for producing and treating spaced continuous planting slits and normally supported solely by ground wheels resting on the edges of the respective planting slits and imposing the weight of the machine thereon.

30. In a double reforesting machine, means at each side of the machine for slitting the sod, enlarging the slit, undercutting and lifting its side edges, and allowing the slit to close itself, said means being arranged in transversely spaced fore and aft planes, a platform between said means, a seat for an operator at the inside of each of said fore and aft planes enabling the operators to set trees by hand in the respective slits as they narrow from their enlarged to their closed portions, and ground wheel means at the rear of the machine in each of said planes.

31. In a machine of the class described, means for producing two spaced continuous planting slots, means for supporting an operator at one side of each slot within easy reach of an open part of the slot for setting plants therein, a set of heeling wheels for each slot located in rear of the means for producing the slots and supported on a common cross bar, and means for adjusting the position of the cross bar to simultaneously raise both pairs of wheels to locations in which they are freely accessible or lower them into selected weight supporting positions.

32. In a double machine for reforestation, means at each side of the machine for forming and treating a continuous slit for tree planting, two pairs of heeling wheels, the wheels of each pair being set in planes intersecting each other in substantially the plane of the respective slits, said heeling wheels being spaced to the rear of the slit forming and treating devices to provide room for manual tree setting, a common cross bar supporting both said pairs of heeling wheels, means for simultaneously moving them clear and for adjusting them in inactive position, and in active heeling and ground wheel positions, ground wheels in rear of said heeling wheels, and a sheet metal platform provided with seats for tree-setters within reach of the respective tree planting spaces at the opposite sides of the machine.

33. In a machine of the character described, means for producing a continuous slit for purposes of plant setting and for slightly widening and opening up the same and making it self-closing, a seat on said machine for a plant setter at one side of the plane of said slit within reach of its open part, a pair of heeling wheels located in planes intersecting the plane of said slit and adapted to exert pressure downward and inward on the respective edges of said slit opposite the set plant, and a guard of flexible material supported in advance of the converging edges of said heeling wheels to protect the hand of the plant setter as it moves rearward in the plant setting operation.

34. In a machine of the class described, a front axle having rotatably mounted thereon at each end a normally inactive ground wheel, tongue structure hinged on the axle, and two coulters each mounted on the tongue structure at one side of the machine beneath said axle, and having traction ground wheel drums fast to its disc and normally supporting the front axle.

35. A machine for reforestation comprising a main frame having a front axle, a braced tongue structure capable of turning movement thereon, and having secured thereto a bar extending across the machine, a pair of arms at each side of the machine mounted to turn on the axle and secured by brace bars to said cross bar so that they turn with the tongue on the axle, and a coulter rotatably mounted on a stub shaft carried by each said pair of arms beneath the axle, each said coulter having fast thereto traction ground drums, each said pair of braced arms being sufficiently resilient to permit temporary independent transverse displacement of each coulter under severe strain.

36. In a machine of the character described, ground wheel means, an axle, a wheel eccentrically mounted thereon by an eccentric hub fitting said axle for rotation thereon, said wheel having an idling position in which its main extension is rearward from the axle and an active position in which its main extension is forward and wherein it constitutes a lever for raising the axle and machine over an obstacle as the machine is moved forward.

37. In a machine of the class described, a front axle, and a wheel eccentrically mounted on each end of the axle by a hub fitting said axle for rotation thereon, the said wheels having on their peripheries on the side away from the eccentric hub and in front and entering or about to enter the ground when the wheel is turned forward into contact with the ground in advance of the machine, removable means for preventing slipping, whereby either wheel when so turned will act as a lever to raise the axle and associated parts over an obstacle when the machine is moved forward.

38. In a machine of the class described, a vehicle frame having a front axle, a lifting member rotatably mounted on one end of said axle and having a ground contact tread portion, planting slot producing means near that end of the axle, said lever being longer than the height of said axle above the ground so that when turned into contact with the ground in advance of the machine it acts to raise the machine with said planting slot producing means over an obstacle as the machine is moved forward.

39. In a machine of the class described, a front axle, a coulter having fast thereto traction ground drums of lesser diameter mounted for rotation in supporting arms hinged to said axle and depending therefrom, a plow immediately behind and in line with the coulter, a wheel having an eccentric hub rotatably mounted on said axle, said wheel when in contact with the ground in advance of the machine acting as a lever to raise the axle, coulter, plow and associated parts over an obstacle as the machine is moved forward.

40. In a machine of the class described, a ground wheel having mounted thereon near its rim a bell, and a weighted swinging striker hung on the wheel adjacent its hub and having a head adapted to strike the bell once in each revolution to announce each completion of the predetermined measured distance separating each plant set from the correct location of the next.

41. In a machine of the class described as set forth in claim 40, an anvil adjacent the rim of the wheel spaced from the bell about 90°, a corresponding hammer on the side of the striker away from the bell to swing against the anvil once in each rotation of the wheel to give a second signal.

42. In a machine of the class described, a timer comprising a trailer connected to the frame of the machine by a universal joint and having a battery box and a trailer ground wheel supporting the same, an electric bell in the battery circuit and means for closing the circuit once in each revolution of the trailer wheel to ring the bell.

43. A machine of the class described comprising, a vehicle frame, a plow beam mounted on said frame, a plow carried by the plow beam in a fore and aft plane, a tongue mounted to turn with reference to said frame on an axis transverse thereto, a draft iron pivotally mounted on the tongue in advance of said axis and upstanding above the tongue, an equalizer bar mounted on said draft iron, the plow beam having a forward extension beyond the axis on which the tongue turns and also extending upward in advance of said axis, and a draft connection flexible with respect to said draft iron and upward extension and adjustable to different heights on said extension to alter the draft angle.

RALPH ROYAL WALLING.